United States Patent

Brown et al.

[11] Patent Number: 5,374,370
[45] Date of Patent: Dec. 20, 1994

[54] TYPE B ALUMINOSILICATES WITH LOW SI:AL RATIO FOR DETERGENT USE

[75] Inventors: Graham T. Brown, Wirral, England; Theo J. Osinga, An Cadier en Keer, Netherlands; Michael J. Parkingston; Andrew T. Steel, both of Wirral, England

[73] Assignee: Unilever Patent Holdings B.V., Rotterdam, Netherlands

[21] Appl. No.: 12,807

[22] Filed: Feb. 2, 1993

Related U.S. Application Data

[63] Continuation of Ser. No. 430,988, Nov. 3, 1989, abandoned.

[30] Foreign Application Priority Data

Nov. 3, 1988 [GB] United Kingdom ............... 8825783
May 2, 1989 [GB] United Kingdom ............... 8910029

[51] Int. Cl.$^5$ .................... C11D 3/12; C11D 17/06
[52] U.S. Cl. ..................... 252/174.25; 252/174
[58] Field of Search ............. 423/328, 329; 252/140, 252/174.25, 179, 174

[56] References Cited

U.S. PATENT DOCUMENTS

| | | | |
|---|---|---|---|
| 3,008,803 | 11/1961 | Milton | 423/329 |
| 3,112,176 | 11/1963 | Haden | 423/118 |
| 3,535,075 | 10/1970 | Ueda | 23/112 |
| 4,180,485 | 12/1979 | Llenado | 252/532 |
| 4,265,777 | 5/1981 | Boyer | 252/113 |
| 4,275,048 | 6/1981 | Stein | 423/329 |
| 4,405,483 | 9/1983 | Kuzel | 252/140 |
| 4,770,815 | 9/1988 | Baker | 252/542 |

FOREIGN PATENT DOCUMENTS

| | | |
|---|---|---|
| 0021491 | 1/1981 | European Pat. Off. . |
| 0257700 | 3/1988 | European Pat. Off. . |
| 2849898 | 11/1978 | Germany . |

OTHER PUBLICATIONS

W. C. Beard: "Molecular Sieve Zeolites–I, Advances in Chemistry Series 101", pp. 237–249 (1971).

Primary Examiner—Christine Skane
Assistant Examiner—Erin M. Higgins
Attorney, Agent, or Firm—Cushman, Darby & Cushman

[57] ABSTRACT

Aluminosilicates in the form of P type zeolites are used as detergency builders and have a silicon to aluminium ratio not greater than 1.33, preferably above 0.9. These zeolites will usually have a calcium binding capacity of at least 150 mg CaO per gram of anhydrous aluminosilicate. A preferred form of the zeolite P has a silicon to aluminium ratio up to 1.15, and preferably above 0.9, with a tetragonally distorted cubic crystal structure. A process of the preparation of these zeolite P builders is described.

13 Claims, No Drawings

TYPE B ALUMINOSILICATES WITH LOW SI:AL RATIO FOR DETERGENT USE

This is a continuation of application Ser. No. 07/430,988, filed on Nov. 3, 1989, which was abandoned upon the filing hereof.

TECHNICAL FIELD

The present invention relates to the use of certain aluminosilicates of the zeolite P type as detergency builders, and to a novel zeolite P having an especially low ratio of silicon to aluminium.

BACKGROUND AND PRIOR ART

Crystalline and amorphous sodium aluminosilicates are well known as detergency builders. Detergent compositions containing crystalline aluminosilicates are disclosed, for example, in GB 1 473 201 (Henkel). Amorphous aluminosilicates have also been proposed for use as detergency builders, for example, in GB 1 473 202 (Henkel), while GB 1 470 250 (Procter & Gamble) discloses detergent compositions containing mixed crystalline-amorphous aluminosilicates.

The crystalline sodium aluminosilicate zeolite A is the preferred material for detergents use because of its high capacity for taking up calcium ions from aqueous solution. Many other crystalline zeolites are known, for example, zeolite X, zeolite Y, zeolite P (also known as zeolite B) and zeolite C, and have found various uses outside the detergents industry. The use of some of these zeolites in detergent compositions has been suggested in the art: for example, EP 21 491A (Procter & Gamble) discloses detergent compositions containing a builder system which includes zeolite A, X or P(B) or mixtures thereof, and compositions containing hydrated zeolite B are disclosed in Examples VIII and IX. As far as commercially available detergent products are concerned, however, it is generally true to say that aluminosilicates other than zeolite A have not found favour as detergency builders because their calcium ion uptake is either inadequate or too slow. Zeolite A has the advantage of being a "maximum aluminium" structure containing the maximum possible proportion of aluminium to silicon—or the theoretical minimum Si:Al ratio of 1.0—so its capacity for taking up calcium ions from aqueous solution is intrinsically greater than those of zeolites X and P which generally contain a lower proportion of aluminium (or have a higher Si:Al ratio).

The structure and characteristics of zeolite P are also summarised succinctly by Donald W Breck in his standard work, "Zeolite Molecular Sieves" (Robert E Krieger Publishing Company, Florida, first published 1974), on pages 72–73 and 168 of the 1984 edition. The term zeolite P actually embraces a series of synthetic zeolite phases, of which the commonest are the cubic (zeolite B or $P_c$) and the tetragonal (zeolite $P_t$). The typical oxide formula is:

$$M_{2/n}O.Al_2O_3.2.0-5.0SiO_2.5H_2O \qquad (I)$$

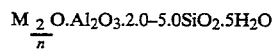

wherein M is an n-valent cation, typically an alkali metal cation, most usually sodium; and the typical unit cell content is:

$$M_{6/n}[(AlO_2)_6(SiO_2)_{10}].15H_2O \qquad (II)$$

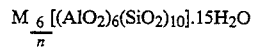

In theory, therefore, the Si:Al ratio can range from 1.0 to 2.5, but according to William C. Beard, in "Molecular Sieve Zeolites", Adv. Chem Ser., 101, 237 (1971), the lowest value that has been observed is 1.1 (1.08).

U.S. Pat. No. 3,008,803 (Milton/Union Carbide) relates to the manufacture of crystalline zeolite P(B) and discloses a Si:Al ratio range of from 1.0 to 2.5. The average value is said to be about 1.75. This is consistent with the disclosure of DE 2 620 293A (Henkel, Degussa), which discloses the preparation of zeolite of type P, using destructured kaolin as starting material: sodium zeolite P having a Si:Al ratio ranging from 1.35 to 2.65 is disclosed. Materials having ratios in this range are intrinsically incapable of taking up sufficient quantities of calcium ions to be of interest as alternatives to zeolite A for detergency building.

Example 8 (column 5 line 60 to column 6 line 5) of the Milton patent describes the preparation of a material described as a type B(P) zeolite having a Si:Al ratio of 1.085. Repetition of that Example by the present inventors has failed to give a product as described, but instead gives mixtures having poor detergency building properties.

The present inventors have now succeeded in preparing samples of crystalline zeolite P having lower Si:Al ratios, ranging from 0.9 to 1.33, and have found these materials to be outstandingly effective as detergency builders. The materials with Si:Al ratios of 1.15:1 or below, which are particularly effective, were found to be characterised by an X-ray diffraction pattern not previously reported. Zeolites of the P type with Si:Al ratios below 1.07:1 are believed to be novel materials.

DEFINITION OF THE INVENTION

Accordingly, a first subject of the invention is a detergent composition comprising a surfactant system, a detergency builder system, and optionally other conventional components; the detergency builder system comprising an alkali metal aluminosilicate of the zeolite P type having a silicon to aluminium ratio not greater than 1.33, and preferably within the range of from 0.9 to 1.33, and more preferably in the range from 0.9 to 1.20. A preferred upper limit for this ratio is 1.15 and a preferred range 0.9 to 1.15. The aluminosilicate will preferably have a calcium binding capacity of at least 150, more preferably 160, mg CaO per g of anhydrous aluminosilicate. The properties of the aluminosilicate are also dependent on the particle size and preferably the $d_{50}$ (as herein defined) is in the range from 0.1 to 5.0 microns, preferably to 1.0 microns, and, more preferably, the $d_{80}$ is below 1 micron and the $d_{90}$ below 3 microns. Use of aluminosilicates in the range 0.1 to 1 micron or having $d_{80}$ below 1 micron or $d_{90}$ below 3 micron allows the detergent composition to be in stable liquid form. Usually the detergent composition contains 20% to 80% by weight of the detergency builder system and may contain 5% to 80% by weight of the alkali metal aluminosilicate.

A second subject of the invention is an alkali metal aluminosilicate of the zeolite P type having a silicon to aluminium ratio not greater than 1.33, preferably within the range of from 0.9 to 1.33, and having a calcium binding capacity (as hereinafter defined) of at least 150 mg CaO per g of anhydrous aluminosilicate, preferably at least 160 mg CaO.

A third subject of the invention is a process for the preparation of an alkali metal aluminosilicate of the zeolite P type having a silicon to aluminium ratio not exceeding 1.33, preferably having a calcium binding capacity of at least 150 mg CaO per g of aluminosilicate, which comprises the steps of:

(i) mixing together a sodium aluminate having a mole ratio $Na_2O:Al_2O_3$ within the range of from 1.4 to 2.0 and a sodium silicate having a mole ratio $SiO_2:Na_2O$ within the range of from 0.8 to 3.4 with vigorous stirring at a temperature within the range of from 25° C. to boiling point, usually 95° C., to give a gel having the following composition:

$Al_2O_3$: (1.75–3.5) $SiO_2$: (2.3–7.5) $Na_2O$: (80–450)$H_2O$;

(ii) ageing the gel composition for 0.5 to 10 hours, preferably 2 to 5 hours, at a temperature within the range of from 70° C. to boiling point, usually 95° C., with sufficient stirring to maintain any solids present in suspension;

(iii) separating the crystalline sodium aluminosilicate thus formed, washing to a pH within the range of from 10 to 12.5, and drying to a moisture content of not less than 5 wt. %.

A fourth subject of the invention is an alkali metal aluminosilicate of the zeolite P type having a silicon to aluminium ratio not greater than 1.15, preferably within the range of from 0.9 to 1.15, and having a tetragonally distorted cubic crystal structure. The calcium binding capacity (as herein defined) will usually be at least 150, preferably at least 160, mg CaO per g anhydrous aluminosilicate. The preferred silicon aluminium ratio is in the range 0.9 to 1.15.

A fifth subject of the invention is an alkali metal aluminosilicate of the zeolite P type having a silicon to aluminium ratio of less than 1.07, preferably within the range of from 0.9 to 1.07.

Usually the aluminosilicates of the invention will be in the sodium salt form. The preferred particles sizes for aluminosilicates of the invention are: $d_{50}$ within the range 0.1 to 5 micron, preferably up to 1.0 micron; $d_{80}$ below 1.0 micron and $d_{90}$ below 3 micron.

DETAILED DESCRIPTION OF THE INVENTION

The Aluminosilicate Builder

The aluminosilicate materials with which the present invention are concerned are of the zeolite P type, have Si:Al ratios not greater than 1.33, and have unexpectedly high calcium binding capacities of at least 150 mg CaO, preferably at least 160 mg CaO, per g anhydrous aluminosilicate. The Si:Al ratio preferably lies within the range of from 0.9 to 1.33, more preferably from 0.9 to 1.2.

The present inventors have also identified a class of materials within this larger group in which the Si:Al ratio is not greater than 1.15 and which are characterised by a tetragonally distorted cubic crystal structure. This has not been described in the literature.

The normal form of zeolite P, as described in the published literature, is the cubic (P1 or $P_c$) form. At high temperatures this can be converted to a tetragonal (P2 or $P_t$) form. The new materials of the invention having Si:Al ratios of 1.15 or less have been found by X-ray diffraction to have a structure corresponding to the known cubic P1 structure but with a significant tetragonal distortion.

As will be shown in detail in the Examples below, the aluminosilicate materials of the invention are capable of removing calcium ions from an aqueous solution to a residual level lower than that observed for commercial zeolite A, and at substantially higher rates. The uptake of magnesium ions in the presence of calcium ions appears to be comparable to that of commercial zeolite A.

The aluminosilicates of the present invention are in alkali metal salt form. The preferred cation is sodium.

Characterisation of the Aluminosilicate Builder

Identification of the various aluminosilicates was carried out by X-ray diffraction and by magic angle spinning nuclear magnetic resonance spectroscopy. Elemental compositions were determined by X-ray fluorescence spectrometry.

X-ray diffraction patterns were collected using Cu $K_{alpha}$ radiation on an automated Philips powder diffractometer. Alpha-alumina was added to each sample as an internal calibrant. The data were recorded using a step size of 0.025° (2 theta) and a time interval of 20 seconds per point. The diffraction data were analysed using a profile fitting program which refined the position, width and intensity of each peak using a squared Lorentzian (Cauchy) peak shape and took account of the alpha doublet splitting.

The X-ray diffraction patterns of a number of samples of sodium zeolite P having different Si:Al ratios, prepared as described below under "Preparation of the aluminosilicate builder", were examined.

A material having a Si:Al ratio of 1.48 (outside the invention) exhibited broad peaks associated with small crystallite size and crystallite strain or disorder. The peaks did not display any observable splitting and corresponded with the pattern reported for pseudo cubic zeolite P (i.e. zeolite P1, B1 or $P_c$) with a cell size $a_o$ of 10.04±0.02 Å. The peak positions and intensities were as shown in Table 1.

A decrease in the Si:Al ratio was found to lead to a broadening of the peaks until at ratios of 1.15 and below discernible splitting was observed. These split peaks were not fully resolved and were fitted with a least-squares refinement program to determine the peak parameters. The unit cell parameters were determined form the (103/310) pair of reflections at approximately 28° 2 theta. The a and b cell parameters for the materials with a Si:Al ratio<1.15 were essentially unchanged from the cubic cell size of 10.04±0.02 Å, but the c cell constant was expanded to 10.13–10.20 Å, indicating a tetragonal (a=b≠c) rather than a cubic (a=b=c) unit cell. The peak positions and intensities for a sample within the invention, having a Si:Al ratio of 1.00, were as shown in Table 2.

TABLE 1

| X-ray diffraction data for zeolite P (Si:Al = 1.48) | | |
|---|---|---|
| Miller indices h, k, l | d/Å | I/Io |
| 110 | 7.11 | 55 |
| 200 | 5.02 | 34 |
| 211 | 4.10 | 42 |
| 202 | 3.52 | 1 |
| 310 | 3.18 | 100 |
| 222 | 2.893 | 5 |
| 321 | 2.684 | 43 |

TABLE 1-continued

X-ray diffraction data for zeolite P (Si:Al = 1.48)

| Miller indices h, k, l | d/A | I/Io |
|---|---|---|
| 400 | 2.518 | 2 |
| 411, 330 | 2.362 | 5 |

TABLE 2

X-ray diffraction data for zeolite P (Si:Al = 1.00)

| Miller indices h, k, l | d/A | I/Io |
|---|---|---|
| 101 | 7.13 | 76 |
| 002 | 5.11 | 25 |
| 200 | 5.02 | 31 |
| 112 | 4.15 | 17 |
| 211 | 4.10 | 66 |
| 202 | 3.52 | 3 |
| 013 | 3.221 | 61 |
| 310 | 3.167 | 100 |
| 222 | 2.907 | 7 |
| 123 | 2.707 | 59 |
| 321 | 2.685 | 42 |
| 004 | 2.554 | 3 |
| 400 | 2.500 | 6 |
| 114 | 2.401 | 7 |
| 411 | 2.364 | 11 |

Particle Size of the Aluminosilicate Builder

Preferred aluminosilicates of the invention are also characterised by a small average particle size and an especially narrow particle size distribution. Typically the particle size may be within the range of from 0.4 to 7 micrometers, 90–95% by weight of the material having a particle size within the range of from 1 to 5 micrometers, and the material being virtually free of particles larger than 10 micrometers and particles smaller than 0.1 micrometers.

A preferred especially finely divided aluminosilicate in accordance with the invention has a $d_{50}$ (as defined below) within the range of from 0.1 to 5.0 micrometers, preferably within the range of from 0.1 to 1.0 micrometers, and more preferably within the range of from 0.4 to 0.7 micrometers. The quantity "$d_{50}$" indicates that 50% by weight of the particles have a diameter smaller than that figure, and may be measured by means of a Sedigraph (Trade Mark), type 5000D, ex Micromeritics, USA; and the quantities "$d_{80}$", "$d_{90}$" etc., which have corresponding meanings, may be measured similarly. Especially preferred materials of the invention have $d_{80}$ below 1 micrometer, and $d_{90}$ below 3 micrometers.

Various methods of measuring particle size are known, and all give slightly different results; some (like the Sedigraph) give weight-average particle sizes, some give number-average particle sizes, and some give volume-average particle sizes. In the present specification number-average particle sizes measured by means of a Malvern Mastersizer (Trade Mark) are also quoted; numerically these differ only insignificantly from the Sedigraph figures.

These preferred very finely divided aluminosilicates are of especial interest as builders for liquid detergent compositions.

Calcium Binding Capacity of the Aluminosilicate Builder

For the purposes of the present invention two different methods were used to determine calcium binding capacity.

METHOD I

In order to characterise the aluminosilicate builders in accordance with the invention, the standard method described in GB 1 473 201 (Henkel) was used. In this test, 1 g of the aluminosilicate was dispersed in 1 liter of an aqueous solution containing 0.594 g of $CaCl_2$ (equivalent to 300 mg of CaO per liter) and adjusted to a pH of 10 with dilute NaOH. The suspension was vigorously stirred at a temperature of 22°±2° C. for 15 minutes, after which time the aluminosilicate was filtered off and the residual hardness x in mg CaO/liter of the filtrate determined using a calcium electrode. The calcium binding capacity was then calculated from the formula Calcium binding capacity = 300 − x.

The theoretical maximum value, for a zeolite of Si:Al ratio of 1.0, is 197 mg CaO/g anhydrous aluminosilicate.

The calcium binding capacities of some samples of zeolite P, prepared as described below, and of a commercial sample of zeolite A (Wessalith (Trade Mark) zeolite 4A ex Degussa) were as follows:

| Si:Al | mg CaO/g |
|---|---|
| 1.00 | 167–171 |
| 1.21 | 163–164 |
| 1.28 | 161–163 |
| 1.46 | 143–145 |
| zeolite A | 170 |

Thus this test shows zeolite P of low Si:Al ratio, in accordance with the invention, to have a calcium binding capacity comparable to that of commercial zeolite 4A, while zeolite P of higher Si:Al ratio is greatly inferior.

METHOD II

Calcium binding capacities were also compared using a modified version of Method I, in which background electrolyte was present. This modified version will be called the 'effective calcium binding capacity' to distinguish it from Method I. This method provides a more realistic indicator of calcium ion uptake in a wash liquor environment.

A sample of each aluminosilicate was first equilibrated to constant weight (over saturated NaCl solution) and the water content measured. Each equilibrated sample was dispersed in water (1 cm$^3$) in an amount corresponding to 1 g dm$^{-3}$ (dry), and the resulting dispersion was injected into a stirred solution of total volume 54.923 cm$^3$, consisting of 0.01M NaCl solution (50 cm$^3$) and 0.05M $CaCl_2$ (3.923 cm$^3$). This corresponded to a concentration of 200 mg CaO per liter, i.e. just greater than the theoretical maximum amount (197 mg) that can be taken up by a zeolite of Si:Al ratio 1.00. The change in $Ca^{2+}$ ion concentration was measured by using a $Ca^{2+}$ ion selective electrode, the final reading being taken after 15 minutes. The temperature was maintained at 25° C. throughout. The $Ca^{2+}$ ion concentration measured was subtracted from the initial concentration, to give the effective calcium binding capacity of the zeolite sample. Typical results were as follows:

| Si:Al | mg CaO/g |
| --- | --- |
| 1.005 | 159.1 |
| 1.12 | 155.1 |
| 1.21 | 146.1 |
| 1.46 | 122.9 |
| zeolite A | 151.9 |

Under these more realistic conditions, a clear benefit for the materials of very low Si:Al ratio (<1.15) could be observed.

Rate of Calcium Ion Uptake

Also important for a detergency builder is the rate of removal of $Ca^{2+}$ ions from the wash liquor. The following table shows the time (seconds) taken for each material, at a concentration of 1.48 g dm$^{-3}$ and at a temperature of 25° C., to reduce the calcium ion concentration in an 0.01M sodium chloride solution from an initial value of $2\times10^{-3}$M to the level specified.

| Si:Al ratio | [$Ca^{2+}$] (M) | | | |
| --- | --- | --- | --- | --- |
| | $5\times10^{-4}$ | $10^{-4}$ | $5\times10^{-5}$ | $10^{-5}$ |
| zeolite 4A | 14 | 36 | 45 | 95 |
| 1.005 | 2 | 6.5 | 8 | 11.5 |
| 1.12 | 1 | 2 | 2.5 | 4 |
| 1.21 | 1 | 2.5 | 3 | 5 |
| 1.46 | 1 | 3.5 | 8 | ineffective |

Thus the material of Si:Al ratio 1.12 displayed a rate of calcium ion uptake at 25° C. about 14–24 times as great as that of commercial zeolite 4A. The material of ratio 1.46 (outside the invention) also displayed a high rate of calcium ion uptake, but was not capable of reducing the residual level in solution below $5\times10^{-5}$.

Preparation of the Aluminosilicate Builder

Like other zeolites, zeolite P may be prepared by reacting a silica source and an alkali metal aluminate, generally a sodium aluminate. Whatever the cation finally required, it is generally preferred to prepare the sodium salt and then, if necessary, to carry out an ion exchange operation. The preferred silicate source is sodium silicate, as discussed in more detail below.

According to the process aspect of the present invention, the zeolite P having a Si:Al ratio of 1.33 or less is prepared by a process including the following essential steps:

(i) mixing together a sodium aluminate having a mole ratio $Na_2O:Al_2O_3$ within the range of from 1.4 to 2.0 and a sodium silicate having a mole ratio $SiO_2:Na_2O$ within the range of from 0.8 to 3.4 with vigorous stirring at a temperature within the range of from 25° C. to boiling point, usually to 95° C., to give a gel having the following composition:

$Al_2O_3$: (1.75–3.5) $SiO_2$: (2.3–7.5) $Na_2O$: (80–450)$H_2O$;

(ii) ageing the gel composition for 0.5 to 10 hours, preferably 2 to 5 hours, at a temperature within the range of from 70° C. to boiling point, usually to 95° C., with sufficient stirring to maintain any solids present in suspension;

(iii) separating the crystalline sodium aluminosilicate thus formed, washing to a pH within the range of from 10 to 12.5, and drying, preferably at a temperature not exceeding 150° C., to a moisture content of not less than 5 wt. %.

Preferred drying methods are spray-drying and flash drying. It appears that oven drying at too high a temperature may adversely affect the calcium binding capacity of the product under certain circumstances.

It is well known from the patent literature that apparently closely similar preparative procedures can give different crystalline forms under slightly different conditions. This is illustrated, for example, by GB 1 082 131 (Peter Spence & Sons Ltd), which relates to a method for preparing crystalline zeolites A, P, C, X and Y and amorphous aluminosilicates using "active" sodium metasilicate pentahydrate as the silica source. It is also discussed by E. F. Freund in "Mechanism of the crystallisation of zeolite X", Journal of Crystal Growth 34 (1976) pages 11–23; in this paper Freund showed that use of an "active" silica source under certain conditions tended to give zeolite X, when the use of an ordinary or inactive silica source gave zeolite P1 ($P_c$).

It was found that commercial sodium metasilicate pentahydrate dissolved in water, and commercial sodium silicate solution (waterglass), are both suitable silica sources for the production of zeolite P in accordance with the invention. Use of colloidal silica as the starting material, however, was found to give zeolite A.

The order of addition of the reactants—addition of silicate to aluminate or vice versa—was found not to influence the product formed. The reactants may be added together either rapidly or slowly. Rapid addition at ambient temperature, and slow addition at elevated temperature (90°–95° C.) both gave the desired product.

Vigorous stirring of the gel during the addition of the reactants, and at least moderate stirring during the subsequent ageing step, however, appear to be essential for the formation of pure zeolite P. In the absence of stirring, various mixtures of crystalline and amorphous materials may be obtained.

Detergent Compositions

The aluminosilicate materials of the present invention may be incorporated in detergent compositions of all physical types, for example, powders, liquids, gels and solid bars, at the levels normally used for detergency builders. The formulation principles already established for the use of zeolite 4A in detergent compositions may generally be followed. An aluminosilicate material of the invention may be used as a sole detergency builder, or it may be used in conjunction with other builder materials. The aluminosilicate material of the invention may replace zeolite A in built detergent compositions suitable for all normal purposes. Two classes of detergent composition to which the invention is especially applicable are products for washing fabrics, and products for machine dishwashing.

The total amount of detergency builder in the composition will suitably range from 20 to 80% by weight, and this may be constituted wholly or partially by the aluminosilicate material of the invention. The aluminosilicate material of the invention may if desired be used in combination with other aluminosilicates, for example, zeolite A. The total amount of aluminosilicate material in the composition may, for example, range from about 5 to 80% by weight.

Other, supplementary builders may also be present, for example, polycarboxylate polymers such as polyacrylates, acrylic-maleic copolymers, or acrylic phosphinates; monomeric polycarboxylates such as nitrilotriacetates and ethylenediaminetetraacetates; inorganic salts such as sodium carbonate; and many other materials familiar to the skilled detergent formulator.

The invention is of especial applicability to detergent compositions containing no, or reduced levels of, inorganic phosphate builders such as sodium tripolyphosphate, orthophosphate and pyrophosphate.

Detergent compositions of the invention will also contain, as essential ingredients, one or more detergent-active compounds which may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Anionic surfactants are well known to those skilled in the art. Examples include alkylbenzene sulphonates, particularly sodium linear alkylbenzene sulphonates having an alkyl chain length of $C_8$–$C_{15}$; primary and secondary alkyl sulphates, particularly sodium $C_{12}$–$C_{15}$ primary alcohol sulphates; olefin sulphonates; alkane sulphonates; dialkyl sulphosuccinates; and fatty acid ester sulphonates.

Nonionic surfactants that may be used include the primary and secondary alcohol ethoxylates, especially the $C_{12}$–$C_{15}$ primary and secondary alcohols ethoxylated with an average of from 3 to 20 moles of ethylene oxide per mole of alcohol.

The choice of surfactant, and the amount present, will depend on the intended use of the detergent composition. For example, for machine dishwashing a relatively low level of a low-foaming nonionic surfactant is generally preferred. In fabric washing compositions, different surfactant systems may be chosen, as is well known by the skilled detergent formulator, for handwashing products and for machine washing products.

The total amount of surfactant present will of course depend on the intended end use and may be as low as 0.5% by weight, for example in a machine dishwashing composition, or as high as 60% by weight, for example in a composition for washing fabrics by hand. For fabric washing compositions in general, an amount of from 5 to 40% by weight is generally appropriate.

A preferred type of detergent composition suitable for use in most automatic fabric washing machines contains anionic and nonionic surfactant together in a weight ratio of at least 0.67:1, preferably at least 1:1, and more preferably within the range of from 1:1 to 10:1.

Detergent compositions according to the invention may also suitably contain a bleach system. Machine dishwashing compositions may suitably contain a chlorine bleach, while fabric washing compositions may contain peroxy bleach compounds, for example, inorganic persalts or organic peroxyacids, which may be employed in conjunction with activators to improve bleaching action at low wash temperatures. Again, the skilled detergent worker will have no difficulty in applying the normal principles to choose a suitable bleach system.

Other materials that may be present in detergent compositions of the invention include sodium silicate, fluorescers, antiredeposition agents, inorganic salts such as sodium sulphate, enzymes, lather control agents or lather boosters as appropriate, pigments, and perfumes. This list is not intended to be exhaustive.

Detergent compositions of the invention may be prepared by any suitable method. Detergent powders are suitably prepared by spray-drying a slurry of compatible heat-insensitive components, and then spraying on or postdosing those ingredients unsuitable for processing via the slurry. The skilled detergent formulator will have no difficulty in deciding which components should be included in the slurry and which should be postdosed or sprayed on. The aluminosilicate material of the invention may generally be included in the slurry if desired, although other methods of incorporation may of course be used if desired.

As previously indicated, aluminosilicates of the invention of small particle size are particularly suitable for incorporation in liquid detergent compositions. Such products and the methods by which they may be prepared will be within the competence of the skilled detergent formulator.

The invention is further illustrated by the following non-limiting Examples, in which parts and percentages are by weight unless otherwise stated.

EXAMPLES 1 TO 3 AND COMPARATIVE EXAMPLES A AND B

Sodium aluminate ex Laporte (weight percentage composition 20% $Al_2O_3$, 20% $Na_2O$, 60% water), sodium hydroxide and water were placed in a glass beaker fitted with four glass baffles to ensure good mixing. The mixture was stirred to ensure homogeneity, and then heated to 90°–95° C. Commercial sodium silicate (weight percentage composition 30% $SiO_2$, 12% $Na_2O$, 58% water) dissolved in water, also at 90°–95° C., was added slowly (over about 5 minutes) to the aluminate solution with vigorous stirring. Approximately half the total water was introduced with the sodium aluminate, and half with the sodium silicate.

On addition of the sodium silicate solution, gel formation was instantaneous. After addition was complete, the gel was aged at 90°–100° C. for 5 hours with stirring. The product was then filtered hot, washed with water (2×200 cm³) and spray-dried.

Gel compositions, and Si:Al ratios in the products, were as follows:

| A | $Al_2O_3$: 1.0 $SiO_2$: 4.32 $Na_2O$: 187.9 $H_2O$ | — |
| 1 | $Al_2O_3$: 2.0 $SiO_2$: 4.32 $Na_2O$: 187.9 $H_2O$ | 1.005 |
| 2 | $Al_2O_3$: 2.7 $SiO_2$: 4.32 $Na_2O$: 187.9 $H_2O$ | 1.12 |
| 3 | $Al_2O_3$: 3.0 $SiO_2$: 4.32 $Na_2O$: 187.9 $H_2O$ | 1.21 |
| B | $Al_2O_3$: 4.0 $SiO_2$: 4.32 $Na_2O$: 187.9 $H_2O$ | 1.46 |

Thus the silica to alumina mole ratio in the gel was varied while keeping other mole ratios constant.

The amounts of reactants used in each Example were as follows:

|  | A | 1 | 2 | 3 | B |
|---|---|---|---|---|---|
| Na aluminate (g) | 50.00 | 50.00 | 50.00 | 50.00 | 50.00 |
| NaOH (g) | 18.08 | 15.04 | 12.75 | 12.04 | 9.00 |
| Na silicate (g) | 19.60 | 39.20 | 52.92 | 58.80 | 78.40 |

-continued

| | A | 1 | 2 | 3 | B |
|---|---|---|---|---|---|
| Total water | 286.11 | 275.40 | 267.95 | 264.68 | 254.00 |
| $SiO_2:Al_2O_3$ (gel) | 1 | 2 | 2.7 | 3 | 4 |
| Si:Al (product) | — | 1.005 | 1.12 | 1.21 | 1.46 |

The products of Examples 1 to 3 and Comparative Example B were all zeolite P. The products of Examples 1 and 2 were of tetragonally distorted cubic structure, while the products of Example 3 and Comparative Example B were cubic zeolite P. The product of Comparative Example A was a sodalite/zeolite A/amorphous aluminosilicate mixture.

Number-average particle sizes of the samples were measured by means of a Malvern Mastersizer (Trade Mark). The results were as follows:

| Example | Particle size $d_{50}$ (micrometers) |
|---|---|
| 1 | 2.04 ± 0.70 |
| 2 | 1.63 ± 0.58 |
| 3 | 1.80 ± 0.50 |

EXAMPLES 4 TO 6

The procedure of Examples 1 to 3 was repeated to give gel compositions and products as follows:

| 4 | $Al_2O_3$: 2.70 $SiO_2$: 6.50 $Na_2O$: 187.9 $H_2O$ | 1.13 |
| 5 | $Al_2O_3$: 2.32 $SiO_2$: 3.75 $Na_2O$: 160.0 $H_2O$ | 1.17 |
| 6 | $Al_2O_3$: 2.70 $SiO_2$: 4.32 $Na_2O$: 100.0 $H_2O$ | 1.18 |

COMPARATIVE EXAMPLE C

Example 2 was repeated using a colloidal silica, Ludox (Trade Mark) HS 40 ex Du Pont instead of sodium silicate. This material contains 40% $SiO_2$, 0.43% $Na_2O$. The product was a zeolite A which displayed inferior calcium binding properties to commercial zeolite 4A.

EXAMPLE 7

Example 2 was repeated with slight variations of process conditions.

(i) The sodium silicate solution was added rapidly (within about 10 seconds) to the sodium aluminate solution instead of slowly. An identical product was obtained.

(ii) The order of addition of the reactants was reversed, the sodium aluminate solution being added to the sodium silicate solution. An identical product was obtained.

(iii) The sodium silicate solution was added at ambient temperature, instead of at 90°-95° C., to the sodium aluminate solution. An identical product was obtained.

COMPATATIVE EXAMPLE D

The effect of varying the stirring regime was investigated.

(i) Example 2 was repeated with only moderate stirring during the addition of the sodium aluminate. A mixture of zeolite X and zeolite P was obtained.

(ii) Example 2 was repeated without stirring during the ageing step. Zeolite P was not obtained, the product instead being a mixture of zeolite X and amorphous aluminosilicate.

EXAMPLES 8 to 11, COMPARATIVE EXAMPLES E AND F

In this set of experiments, the effect of varying the $Na_2O$ content of the gel while maintaining other conditions as in Example 2 was explored. This was done by adding varying amounts of sodium hydroxide solution to the sodium aluminate starting material. The results were as shown below, in which Example 2 has been included again to complete the series.

It would appear that, in this particular gel composition, the mole ratio of sodium oxide to alumina in the reaction mixture should be less than 8.5. Preferably it is within the range of from 2.7 to 6.5.

| Example | Mole ratio $Na_2O:Al_2O_3$ in gel | Product |
|---|---|---|
| 8 | 2.7 | Zeolite P |
| 9 | 3.5 | Zeolite P |
| 10 | 4.32 | Zeolite P |
| 11 | 6.5 | Zeolite P |
| E | 8.5 | Sodalite/zeolite A |
| F | 13.0 | Sodalite |

EXAMPLE 12

The procedure of Example 2 was repeated using varying amounts of water corresponding to 100–350 moles of water in the gel formula. In every case the sole product was zeolite P.

EXAMPLE 13

Detergency Test

In this Example the detergency building properties of the material of Example 2 in a low-temperature short-duration wash were compared with those of commercial zeolite 4A (Wessalith (Trade Mark) ex Degussa) by means of a Tergotometer (Trade Mark) test.

Test cloths (four each of two differently soiled types both widely used as general detergency monitors) were washed in the Tergotometer at 25° C. for 10 minutes in 9° French hard ($Ca^{2+}$) water, in a wash liquor having a composition corresponding to a 1 g $dm^{-3}$ concentration of the following detergent formulation:

| | Weight % |
|---|---|
| Sodium linear alkylbenzene sulphonate | 24.0 |
| Nonionic detergent (7EO) | 2.0 |
| Soap (sodium stearate) | 1.0 |
| Zeolite (anhydrous basis) | 35.0 |
| Sodium carbonate | 15.0 |
| Sodium sulphate | 5.0 |
| Minor ingredients and moisture | 18.0 |
| | 100.0 |

The test cloths were then rinsed in water of the same hardness (1 $dm^3$) for 1 minute.

Detergency results, expressed as reflectance increases delta $R_{460}*$, each the average of two runs, were as follows:

| | Test cloth A | Test cloth B |
|---|---|---|
| Example 2 | 62.36 ± 1.234 | 58.99 ± 0.762 |

-continued

|  | Test cloth A | Test cloth B |
| --- | --- | --- |
| Zeolite 4A | 61.71 ± 1.09 | 58.02 ± 0.989 |

Statistical analysis showed the result for the material of Example 2 to be significantly better than that for zeolite 4A on test cloth A to an 80% confidence level, and on test cloth B to a 99% confidence level.

EXAMPLE 14

A comparative study was carried out in two stages. In stage 1 formulations containing zeolite P having a Si:Al ratio of 1.1:1 and a zeolite 4A (obtained from Degussa AG) at equal levels were compared at product dosages of 90 and 120 g per wash. In stage 2 only formulations containing zeolite P were tested and the performance profile established for zeolite P levels in the range 16–24% of product. The results from both stages were then drawn together for consideration of weight effectiveness.

The wash conditions employed for both stages were as follows:
Machine—Miele W756 front loading automatic
Wash cycle—40° C. Cottons main wash only
Main wash duration—30 minutes
Water hardness—30° FH calcium only
Water intake—22 l total volume for main wash
Water inlet temp—20° C.
Wash load—4 kg soiled loads from the laundry service Dispensing of ingredients was via the powder dispenser using sequential addition of active, zeolite and then the remainder of the formulation. Test formulation had the composition:

|  | % wt |
| --- | --- |
| Sodium linear alkyl benzene sulphonate | 6 |
| Nonionic detergent 7ED | 4* |
| Nonionic detergent 3EO | 3* |
| Zeolite | 24 |
| Sodium Carbonate | 12 |
| Sodium Sulphate | 20 |
| SCMC | 0.9 |
| Sodium Metaborate | 11 |
| Savinase 4T (enzyme) | 0.9 |

*obtainable from ICI Ltd of England under the Synperonic Trade Mark.

In each case, the formulation components were added as a 200 ml slurry/solution made up immediately prior to addition and the total elapsed time for addition of all ingredients was in the order of 1.5 minutes.

The monitors of performance comprised AS9, AS10, AS12 and EMPA 101 test cloths and desized cotton sheeting stained with a 40% dispersion of Bandy black clay and washed in water to remove excess soil. Reflectance measurements at 460 nm were used as the measure of soil removal.

For comparisons at equal dosage, 4 replicate washes were carried out using a latin square design over 4 machines. The effect of zeolite P concentration was assessed using 3 replicates over 3 machines for 16% and 20% zeolite P levels and 2 replicates of the 24% level tested in the first stage.

Mean results and 95% confidence limits for formulation differences of statistical significance are given for each product dosage in Table 14/1. At equal dosage, the zeolite is equal or superior to 4A on all monitors.

Zeolite P is significantly better than 4A on AS9, AS12 and EMPA 101 at the higher dosage of 120 g and significantly better on AS10 at the lower dosage of 90 g. Note that, with the exception of AS10, it is the higher dosage which is producing best differentiation between the zeolites. Table 14/1 gives the mean test cloth responses as delta R460*.

TABLE 14/1

|  |  | Dosage (g/wash) | | | | |
| --- | --- | --- | --- | --- | --- | --- |
|  |  | 90 | | 120 | | |
|  |  | P | 4A | P | 4A | 95% |
| AS9 | (42.9) | 17.0 | 15.2 | 23.9 | 17.2 | 2.09 |
| AS10 | (40.1) | 32.7 | 30.2 | 33.6 | 32.4 | 1.38 |
| AS12 | (41.7) | 17.9 | 15.1 | 24.6 | 18.4 | 2.70 |
| EMPA 101 | (10.4) | 13.9 | 13.4 | 20.3 | 16.8 | 2.16 |
| CLAY |  | 18.6 | 18.0 | 19.6 | 18.7 | 1.45 |

The effect of varying zeolite P level was studied at the 120 g dosage level. AS10 and the Bandy black clay test fabrics, as might be anticipated from the above table, gave little sensitivity to zeolite P level but, as shown in Table 14/1, a clear trend was obtained for AS9, AS12 and EMPA 101 response to increase with increasing zeolite P level on the product. As is also indicated in the figure, a zeolite P level of 16% appears roughly equal to 24% Degussa 4A confirming its better weight effectiveness. Mean results are summarised in Table 14/2, this gives the mean test cloth responses as Delta R460* at 120 g dose.

TABLE 14/2

|  | Zeolite P | | | 4A |
| --- | --- | --- | --- | --- |
|  | 16% | 20% | 24% | 24% |
| AS9 | 19.0 | 20.3 | 24.7 | 17.2 |
| AS10 | 33.2 | 33.0 | 33.5 | 32.4 |
| AS12 | 18.6 | 20.6 | 22.0 | 18.4 |
| EMPA 101 | 16.6 | 19.4 | 21.5 | 16.8 |
| CLAY | 19.0 | 18.0 | 16.9 | 18.7 |

In Table 14/2, the results from both sets of washes are given as a function of the zeolite level in the wash. These indicate the importance of changing the level of zeolite against changes in the concentration of the other formulation ingredients (active and enzyme) and suggest it is the test cloth dependences on these factors which give rise to the apparent convergence of zeolite P and zeolite 4A performance as the dosage is increased.

EXAMPLE 15

Zeolite P (Si:Al ratio of 1:1) was used. Zeolite 4A (ex Toyo Soda KK of Japan) and zeolite 13X (ex BDH Ltd of England) were used as supplied. The calcium ion binding measurements were made using a Radiometer calcium electrode.

The zeolites were tested under the following conditions:
Ionic strength-0.005M sodium chloride
Zeolite dosage (dry)-0.35 gdm$^{-3}$
Water hardness-6 Ca, 6 Ca 3 Mg and 9 Ca °FH
Temperature-25° C.

In a typical experiment an amount of zeolite equivalent to 0.35 g dm$^{-3}$ was dispersed in water (1 cm$^3$, pH 10) and a solution of CaCl$_2$ or CaCl$_2$/MgCl$_2$ at the appropriate test concentration. The slurry was stirred using a Teflon stirrer bar. The temperature was maintained at 25° C. throughout. Millivolt readings were taken after 1, 2, 3, 5, 10 and 20 minutes. The concentration of free calcium corresponding to these time intervals was then computed. Each experiment was duplicated and reproducibility was excellent.

Magnesium building was performed by removing a 10 cm³ a liquot with a Millipore filter syringe (0.22 micron) after 20 minutes. The filtrates were analysed, after the appropriate dilutions, by atomic absorption spectroscopy.

Tables 15/1, 15/2 & 15/3 give the log free calcium versus time for 6 Ca, 6 Ca 3 Mg, and 9 Ca. In all cases the final calcium concentration is lowest for zeolite P. For 6 Ca and 6 Ca 3 Mg the P/13X (3:1) mixtures achieve a lower final calcium concentration than Toyo 4A. Since 13X is a worse calcium builder than Toyo 4A, this highlights the superiority of zeolite P over zeolite 4A as a calcium builder. At 9° FH Ca Toyo 4A performs better than zeolite P/13X i.e. at a relatively high calcium water hardness the reduction in zeolite P dosage becomes significant.

TABLE 15/1

| | Calcium 6°FH | | | | | |
| | Time (minutes) | | | | | |
| | 1 | 2 | 3 | 5 | 10 | 20 |
|---|---|---|---|---|---|---|
| Zeolite P | 5.75 | 6.05 | 6.15 | 6.20 | 6.25 | 6.25 |
| Toyo 4A | 5.05 | 5.30 | 5.35 | 5.40 | 5.35 | 5.30 |
| Zeolite P/13X (3:1) | 5.00 | 5.75 | 5.85 | 5.90 | 5.95 | 5.95 |

TABLE 15/2

| | Calcium 6°FH magnesium 3°FH | | | | | |
| | Time (minutes) | | | | | |
| | 1 | 2 | 3 | 5 | 10 | 20 |
|---|---|---|---|---|---|---|
| Zeolite P | 4.65 | 5.25 | 5.55 | 5.65 | 5.80 | 5.85 |
| Toyo 4A | 4.75 | 5.00 | 5.05 | 5.20 | 5.20 | 5.15 |
| Zeolite P/13X (3:1) | 4.40 | 4.80 | 5.00 | 5.15 | 5.35 | 5.45 |

TABLE 15/3

| | Calcium 9°FH | | | | | |
| | Time (minutes) | | | | | |
| | 1 | 2 | 3 | 5 | 10 | 20 |
|---|---|---|---|---|---|---|
| Zeolite P | 3.70 | 4.00 | 4.20 | 4.40 | 4.50 | 4.60 |
| Toyo 4A | 3.90 | 4.15 | 4.25 | 4.25 | 4.25 | 4.25 |
| Zeolite P/13X (3:1) | 3.65 | 3.75 | 3.80 | 4.00 | 4.10 | 4.15 |

Table 15/4 shows the final concentration of magnesium (°FH) for zeolite P, zeolite P/13X and Toyo 4A in the 6 Ca 3 Mg system. Zeolite P and Toyo zeolite 4A are the poorest magnesium builders, with the zeolite P/13X mixture the best (ca 35% magnesium removal versus 20% for zeolite P and Toyo zeolite 4A). The use of zeolite P/13X mixtures result in better calcium and magnesium building than Toyo 4A. However, the calcium building of zeolite P alone is better than the mixtures both in terms of the rate of uptake and the final concentration. The same ionic strength, temperature and dosage were used.

TABLE 15/4

| Sample | Magnesium concentration (°FH) after 20 minutes+ |
|---|---|
| Zeolite P | 2.36 |
| Zeolite P/13X (3:1) | 1.91 |
| Toyo 4A | 2.33 |

+ ±0.05 (99% confidence)

Mixtures of zeolite P with zeolite 13X are seen to be better magnesium builders than either zeolite P or Toyo 4A. They are however poorer calcium builders than zeolite P alone, and their use as an alternative builder depends on whether the superior magnesium building significantly affects detergency.

We claim:

1. A detergent composition comprising 0.5% to 50% by weight of a surfactant system, 20% to 80% by weight of a detergency builder system, and optionally other conventional components; the detergency builder system comprising, in an amount of 5% to 80% by weight of the detergent composition, an alkali metal aluminosilicate of the zeolite P type having a silicon to aluminum ratio not greater than 1.33, the aluminosilicate a particle size $d_{50}$ within the range of from 0.1 to 5.0 micrometers and having a calcium binding capacity of at least 150 mg CaO per g of anhydrous aluminosilicate, said calcium binding capacity being determined by dispersing the aluminosilicate in a liter of an aqueous solution containing 0.594 g of $CaCl_2$ and adjusted to a pH of 10 with dilute NaOH, stirring the resulting suspension at 22+2° C. for 15 minutes, filtering off the aluminosilicate, determining the residual hardness x in mg CaO/liter of the filtrate using a calcium electrode and calculating the calcium binding capacity from the formula:

Calcium binding capacity equals 300−x.

2. A detergent composition as claimed in claim 1, wherein the detergency builder system comprises an alkali metal aluminosilicate of the zeolite P type having a silicon to aluminium ratio within the range of from 0.9 to 1.33.

3. A detergent composition as claimed in claim 2, wherein the detergency builder system comprises an alkali metal aluminosilicate of the zeolite P type having a silicon to aluminium ratio within the range of from 0.9 to 1.2.

4. A detergent composition as claimed in claim 3, wherein the detergency builder system comprises an alkali metal aluminosilicate of the zeolite P type having a silicon to aluminium ratio not greater than 1.15.

5. A detergent composition as claimed in claim 4, wherein the detergency builder system comprises an alkali metal aluminosilicate of the zeolite P type having a silicon to aluminium ratio within the range of from 0.9 to 1.15.

6. A detergent composition as claimed in claim 1, wherein the aluminosilicate is in sodium salt form.

7. A detergent composition as claimed in claim 1, wherein the aluminosilicate has a calcium binding capacity of at least 160 mg CaO per g of anhydrous aluminosilicate.

8. A detergent composition as claimed in claim 1, wherein the aluminosilicate has a particle size $d_{50}$ within the range of from 0.1 to 1.0 micrometers.

9. A detergent composition as claimed in claim 8, wherein the aluminosilicate has a particle size $d_{80}$ below 1 micrometer.

10. A detergent composition as claimed in claim 9, wherein the aluminosilicate has a particle size $d_{90}$ below 3 micrometers.

11. A detergent composition as claimed in claims 8, which is in liquid form.

12. A detergent composition as claimed in claim 1, which contains from 20 to 80 by weight of the detergency builder system.

13. A detergent composition as claimed in claim 9, which contains from 5 to 80% by weight of the alkali metal aluminosilicate.

* * * * *